United States Patent [19]
Larkin et al.

[11] 3,911,646
[45] Oct. 14, 1975

[54] FEEDING APPARATUS FOR BODY TAPED COMPONENTS

[75] Inventors: Joseph F. Larkin, Holland; Robert J. Singer, Wyncote, both of Pa.

[73] Assignee: TRW Inc., Cleveland, Ohio

[22] Filed: Sept. 11, 1974

[21] Appl. No.: 504,921

[52] U.S. Cl. .................. 53/240; 29/200 D; 53/244; 156/584; 221/73
[51] Int. Cl.². ... B65B 5/10; B23P 19/00; B65D 7/42
[58] Field of Search ............ 53/237, 238, 240, 244, 53/246, 393, 184; 156/584; 29/200 D, 203 DS; 221/72, 73, 74

[56] References Cited
UNITED STATES PATENTS

| | | | |
|---|---|---|---|
| 2,152,101 | 3/1939 | Scherer | 53/184 X |
| 2,613,861 | 10/1952 | Goerlitz | 53/246 X |
| 3,705,475 | 12/1972 | Riley | 53/240 X |

Primary Examiner—Travis S. McGehee
Attorney, Agent, or Firm—Lawrence S. Cohen, Esq.

[57] ABSTRACT

An apparatus for dispensing body taped components from tape in which constant tension on the tape feeds the components to a point at which they are removed from the tape and where the feed tension is subject to a counter force prohibiting its movement except when a component is actually removed from the tape.

9 Claims, 4 Drawing Figures

FEEDING APPARATUS FOR BODY TAPED COMPONENTS

BACKGROUND

1. Field of the Invention

The invention relates to apparatus for feeding sequentially held items for removal from the holding means. In particular the invention relates to an apparatus for feeding body taped electrical components for removal from the tape and deposition in a container. It is also directed to such an apparatus including means to convey a container under a number of such dispensing apparatus to accumulate in the container a predetermined mixture of components.

2. Description of the Prior Art

Electrical components, especially axial lead components such as resistors, coils, capacitors, and the like, are frequently packed by manufacturers by being adhered to long tapes which may then be rolled into compact packages or reels. The tape can be adhered to the leads or to the body of the components.

In order to use the components, they must be stripped from the tape. A variety of apparatus are known which can remove the components from the tape. Some such apparatus perform additional functions such as cutting and bending the leads and even inserting the component into a printed circuit board.

It is desirable, and an object of the present invention to provide a low cost apparatus for stripping components, one at a time, and delivering them to a container. A more specific need is seen in the preparation of electrical apparatus kits in which a predetermined number of each of variety of components must be put in a bag. In such case many stripping machines can be arranged in tandem, each loaded with a different component and each providing the number of its particular component determined for the kit. Alternatively each apparatus can dispense a single component, with a separate apparatus for each component desired to be in the resultant package. The present invention provides such apparatus.

SUMMARY OF THE INVENTION

Apparatus for dispensing body taped components in which tensioning means maintains the tape in delivering tension past a delivery point and where the tension is subject to a counter force prohibiting movement of the tape except when a component is actually removed from the tape at the delivery point.

DESCRIPTION OF THE PREFERRED EMBODIMENT

Figure 1:
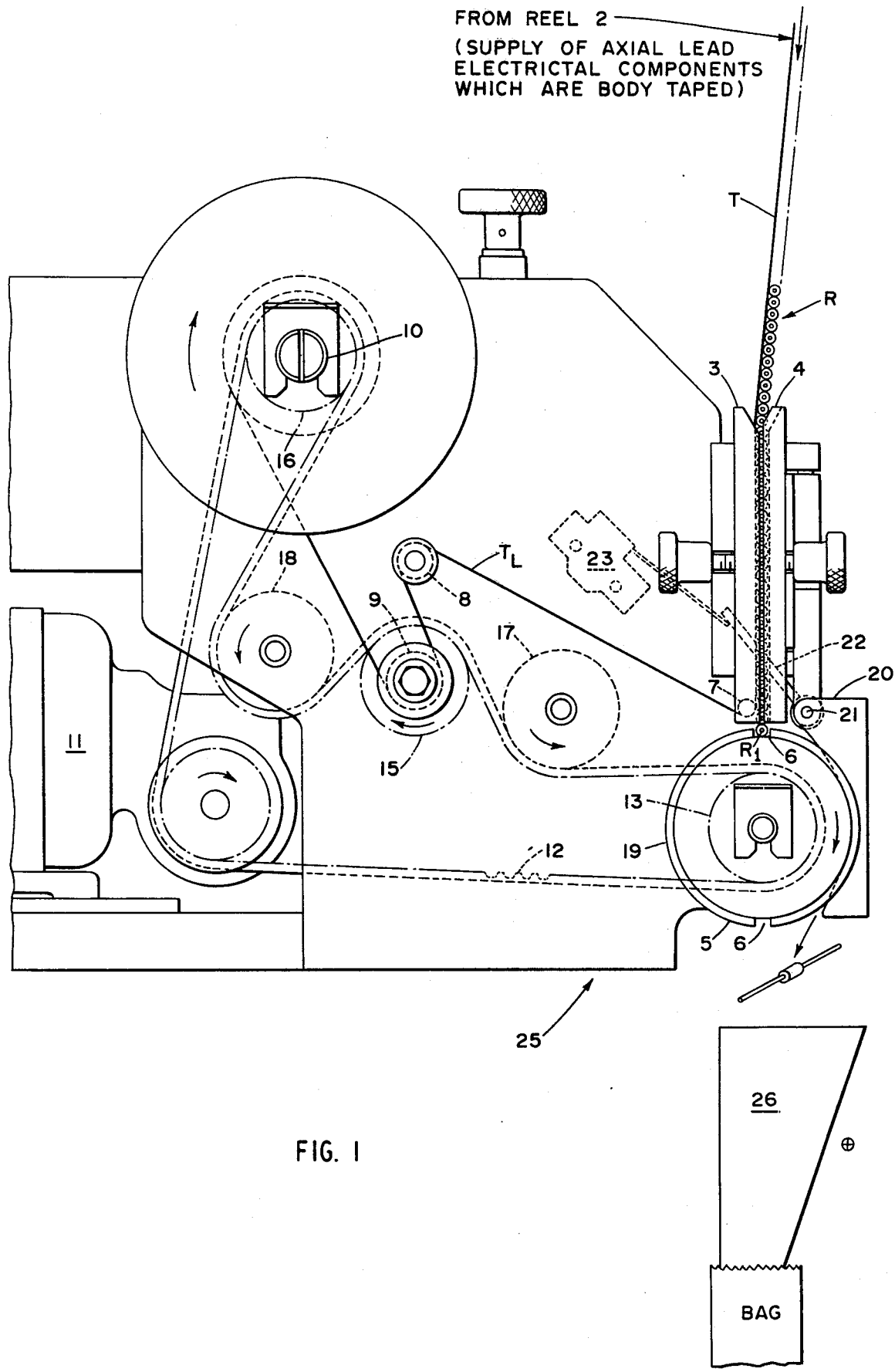
FIG. 1 shows a side view of preferred embodiment of the apparatus.
Figure 2:
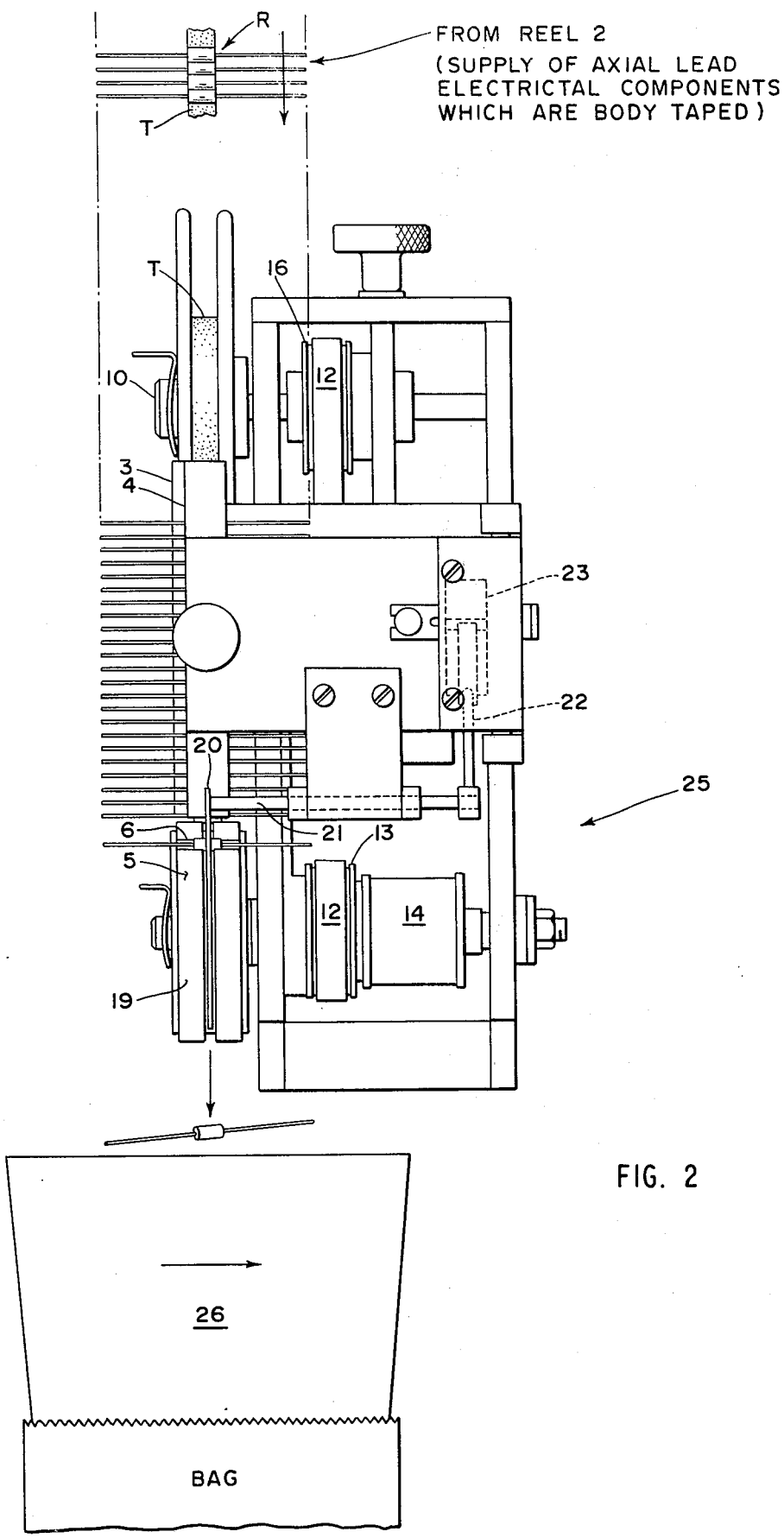
FIG. 2 shows a front view of preferred embodiment of the apparatus.

In FIGS. 1 and 2, the basic elements of the invention are illustrated. A reel holder 1 (FIG. 4 only) has rotatably mounted upon it a reel 2 providing a supply of axial lead electrical components which are body taped. In this description, the exemplary components will be axial lead resistors R.

Extending generally tangentially from the reel 1 are guides 3 and 4. Below the guides, is a feed wheel 5. In the periphery of the feed wheel 5 are diametrically opposed recesses 6. The recesses 6 are large enough to receive the body of a component R. The feed wheel 5 is centered in a direct line below the guides and is laterally positioned as shown in FIG. 2 below the body of the component. A small roller 7 is attached to the guide 3 and positioned so that the surface of the roller 7 is generally tangential to and behind the tape T. The roller 7 may be mounted to rotate freely or may be no more than a pin (preferably quite smooth). The area adjacent the guides 3, 4, the feed wheel 5 and the roller 7 is referred to herein as the stripping point, being the point at which a component R is removed from the tape T.

A tape idler pulley 8 is located above and behind the roller 7. A tape tensioning wheel 9 is located below the tape idler pulley.

A take-up shaft 10 is rearward of and above the pulley 8 and the wheel 9.

The apparatus is driven from a motor drive 11 through a toothed belt 12 which extends around pulley 13 driving a ½- revolution clutch 14. The belt 12 then extends to a pulley 15 driving the tape tensioning wheel 9 and to a pulley 16 driving the take up shaft 10. Intermediate idlers 17 and 18 are used to locate the belt 12.

It will be evident in the following description that certain relative locations of the parts are important to causing the apparatus to operate properly. It will, however, also be evident to those knowledgable in the art that some of the locations of parts are a matter of convenience, compactness or economy.

The component carrying tape T has a leader portion $T_L$, which is conventionally about 30 inches long and has no components R adhered to it. The components are adhered to the tape generally in contact with each other.

In loading the apparatus for use, a reel is installed on the reel holder 2 and the leader $T_L$ is threaded through the guides 3, 4 over the roller 7, the tape idler pulley 8, the tape tensioning wheel 9, and onto the take-up shaft 10. When ready for operation, the components R are stacked in the guides 3, 4 with the forwardmost component $R_1$ deposited in the recess 6 of the feed wheel 5. While the components are applied to the tape nominally in contact with each other, any spaces will tend to be closed as they become part of the stack.

In operation it is necessary that the tape T be maintained in tension to a degree which will be better appreciated as this description commences. The tension on tape T is conveniently provided by driving the tape tensioning wheel 9, by the motor drive 11 through the drive belt 12. The amount of tension can be set by such variables as the surface drag of the tape tensioning wheel 9, its speed of rotation and the area of surface contact of the tape.

Figure 3:
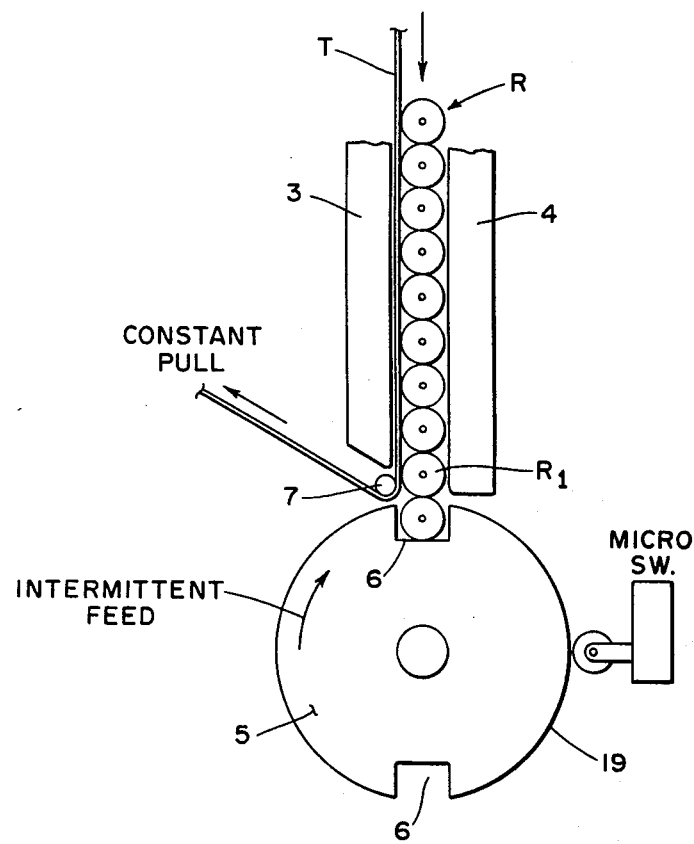
FIG. 3 shows an alternative embodiment of the feed wheel and guides.

The feed wheel 5, is driven through the ½-revolution clutch 14, for intermittent rotation in which the rotation stops momentarily when the recess 6 is in the position shown in the FIGS. 1 and 3. The recess 6 is shown in FIG. 2 in a partially rotated position.

The operation of the apparatus will now be explained starting from the condition shown in FIG. 1 in which the components R are stacked and the forwardmost component $R_1$ is resting in the recess 6 of the feed wheel 5. Then the feed wheel 5 will rotate, conveying with it the forwardmost component $R_1$, until it drops out of the recess 6 by the force of gravity. As the feed wheel 5 rotates the component in the stack bears on the periphery of the feed wheel 5, holding back the stack against the tension on the tape T. As the next recess 6 comes into position under the stack, the new forwardmost component $R_1$ is free to move into the recess 5 and is so pulled by the tape T moving slightly the necessary increment. As the component drops into the recess, it is stripped from the tape.

The movement of the tape, when the recess is in position below the stack of components is caused by the tension on the tape through the tape tensioning wheel 9. However, when the solid portion of the feed wheel 5 is moving past the stack, the tension of the tape T is resisted by the adhesion of the component bodies to it, establishing a counter-force passed upward through the stack from the forwardmost component $R_1$ resting on the solid periphery 19 of the feed wheel 5. Thus, the tension on the tape is predetermined to suffice to move the stack when the recess 6 is in position directly below it. However, the tension should be small enough that the adhesion of the components in the stack is not broken when the forwardmost component $R_1$ is on the periphery 19 of the feed wheel 5.

The component $R_1$ is held in the recess 6 by a pivotably mounted pressure bar 20. As the recess 6 clears the pressure bar 20, the component drops out as shown in FIGS. 1 and 2. The pressure bar 20 may also serve as a no-feed shut off by way of shaft 21, lever 22, and microswitch 23 connected to the power source of the motor drive 11. Thus, if no component appears in the recess 6, the bar 20 pivots inward pivoting the lever 22 to trip the switch 23 and shut off the machine.

An alternative arrangement at the point of stripping the components is shown in FIG. 3. This embodiment can be especially useful for larger component bodies. The roller 7 is mounted below the guide 3. In this case the roller 7 should be fairly small in order to provide a distinct downward force on the component $R_1$ as the recess 6 moves into position below it. The space between the roller 7 and the periphery 19 of the feed wheel 5 should be small to prevent a component from being carried around the roller 7.

Figure 4:
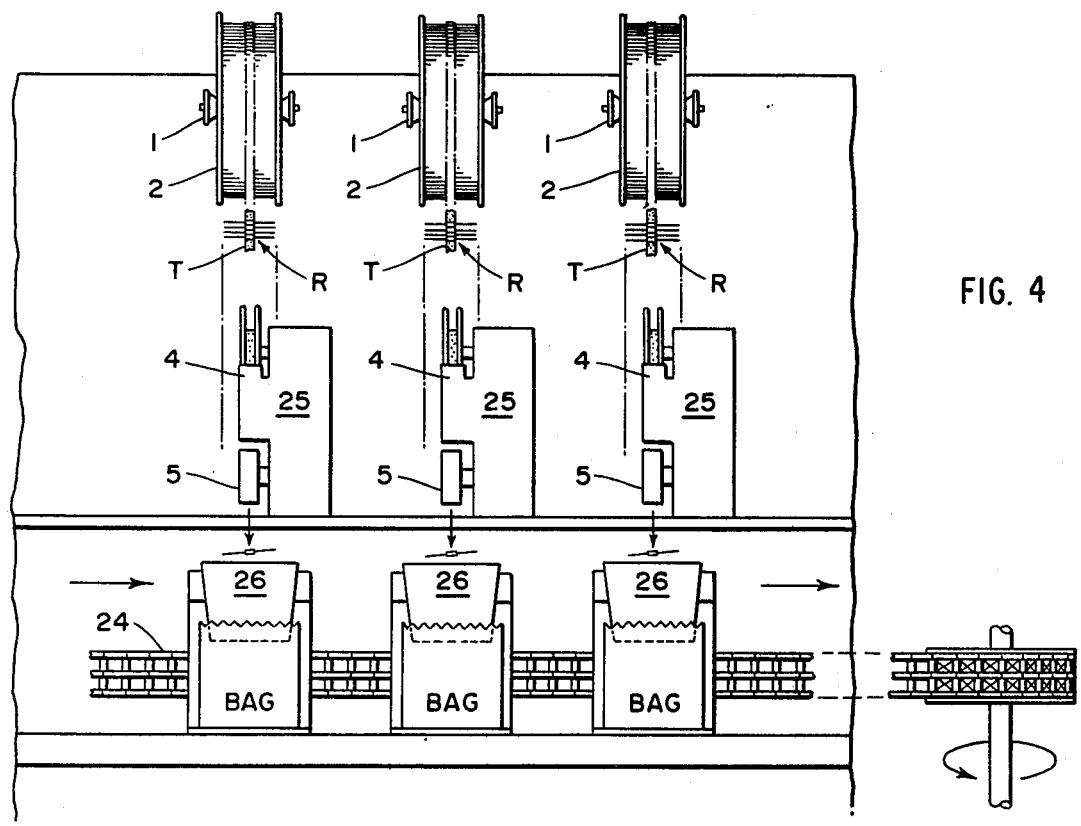
FIG. 4 shows a view of a plurality of the stripping apparatus in tandem and in conjunction with bag conveying apparatus.

One typical application of the invention is in the making up of packages for inclusion in kits for consumer assembly such as the well known Heathkits. In such an application, several of the apparatus are arranged in tandem as shown in FIG. 4. A continuous indexing conveyer 24 is in position below the row of feed apparatus 25 and operates to convey a series of pockets 26 below the point at which components drop out of the recesses 6. A bag is fed onto each pocket before it commences down the row of feed apparatus. The conveyer brings each bag in turn under each feed apparatus and stops while each apparatus, being loaded with a different component drops a component into the bag. If, as is common, more than one of the same component is desired in the bag mix, this can be achieved by running the tandem apparatus at different speeds so that for example one apparatus can deliver two components in the time that another apparatus delivers only one component. All the tandem apparatus would be timed to complete their delivery cycle of one or more components during the time the bags dwell beneath them. Another embodiment would be to have a separate apparatus for each component of the mix, even for duplicates. In this way, the cycle time of each apparatus and the bag conveyor would be the same.

While the above description relates certain embodiments now known to and preferred by the inventor, it is possible for persons skilled in the art to make certain additions, changes and modifications. It is intended by the appended claims to cover such additions, changes and modifications as fall within the scope and spirit of the invention.

We claim:

1. An apparatus for dispensing body taped components comprising:
    means for establishing tension on the tape and for moving the tape past a point at which the components are removed from the tape;
    means for establishing a counter-force comprising a surface bearing upon at least one of the components sufficient to resist the means establishing tension and for moving the tape in order to prevent movement of the tape;
    means for removing a component from the tape;
    means for releasing the counter-force comprising means for removing the bearing surface upon removal of a component from the tape in order to permit movement of the tape a predetermined distance;
    means for re-establishing the counter-force upon movement of the tape the predetermined distance.

2. The apparatus of claim 1 wherein the surface for bearing against at least one of the components is at least partially in the path of movement of the forwardmost component on the tape and prevents it from continuing movement imparted to it by the means for establishing tension and the means for releasing the counter-force thereby established comprises means for removing the surface from its position at least partially in the path of movement of the forwardmost component.

3. The apparatus of claim 2 wherein the surface is the periphery of a rotatable wheel and the means for releasing the counter-force and for removing a component is a recess in the periphery of the wheel for receiving the body of the component therein whereby upon positioning the wheel periphery to bear against the forwardmost component at least partially in its path of movement, the tension will be resisted and upon rotation of the wheel to bring the recess into position adjacent the component, it will be freed to move into the recess and stripped from the tape and the counter-force released, and upon further rotation, the periphery of the wheel will reestablish the counter-force against the succeeding forwardmost component.

4. An apparatus for dispensing body taped axial lead components comprising
    a support frame;
    a supply means mounted on the support frame and adapted to rotatably hold a reel of body taped axial lead components;
    guide means on the support frame for guiding the component carrying tape to a stripping point;
    an intermittently rotating feed wheel having at least one component carrying recess in its periphery, the feed wheel being mounted to present the recess to the stripping point for delivery therein of a component;

tensioning means for maintaining a constant dispersing tension on the component carrying tape;

means for resisting the tension of the tensioning means and cooperating with the feed wheel for intermittently releasing its resistance to the tensioning means upon delivery of a component into the component carrying recess;

control means for rotating the feed wheel to position the recess at the stripping point and to cause the wheel to hesitate sufficiently that the tensioning means will move a component into the recess whereupon the control means causes the wheel to rotate the component from the recess.

5. The apparatus of claim 4 wherein the means for resisting the tension of the tensioning means comprises the periphery of the feed wheel adapted to bear against the body of the component next in position at the stripping point, whereby the tension tending to move the tape past the stripping point is resisted by the force on the components transmitted from the periphery of the feed wheel through components stacked above it and adhered to the tape.

6. The apparatus of claim 5 wherein the component is held in the feed wheel and removed therefrom by gravity upon rotation of the recess to a lower position.

7. The apparatus of claim 6, further comprising packaging means positioned below the feed wheel for receiving components removed therefrom.

8. The apparatus of claim 7 further comprising control means for indexing the packaging means to present a new package after at least one component has been fed into a package.

9. The apparatus of claim 8 further comprising a plurality of said apparatus positioned above a plurality of said packaging means and wherein the packaging means transport a package sequentially under each apparatus for receiving at least one component from each apparatus.

* * * * *